United States Patent [19]

Hasegawa

[11] Patent Number: 4,775,595
[45] Date of Patent: Oct. 4, 1988

[54] MAGNETIC RECORDING MEDIUM

[75] Inventor: Masanaru Hasegawa, Yawata, Japan

[73] Assignee: Matsushita Electric Industrial Co., Ltd., Kadoma, Japan

[21] Appl. No.: 40,665

[22] Filed: Apr. 21, 1987

[30] Foreign Application Priority Data

Apr. 23, 1986 [JP] Japan .................. 61-93706

[51] Int. Cl.$^4$ ............................. G11B 5/702
[52] U.S. Cl. ................... 428/425.9; 252/62.54; 427/128; 428/447; 428/694; 428/695; 428/900
[58] Field of Search ............... 428/425.9, 447, 694, 428/695, 900; 427/128; 360/134–136; 252/62.54

[56] References Cited

U.S. PATENT DOCUMENTS

| | | | |
|---|---|---|---|
| 4,171,406 | 10/1979 | Yamaguchi et al. | 428/900 |
| 4,349,608 | 9/1982 | Shimizu | 428/695 |
| 4,434,210 | 2/1984 | Nakajima | 428/447 |
| 4,501,800 | 2/1985 | Fujiki et al. | 428/900 |
| 4,501,801 | 2/1985 | Kimura et al. | 428/900 |
| 4,555,443 | 11/1985 | Kikugawa | 428/336 |
| 4,556,604 | 12/1985 | Ohbayashi et al. | 428/900 |
| 4,579,780 | 4/1986 | Shinomiya et al. | 428/900 |
| 4,677,030 | 6/1987 | Gerum | 428/900 |

FOREIGN PATENT DOCUMENTS 048120  3/1986  Japan .................. 428/694

Primary Examiner—Ellis P. Robinson
Attorney, Agent, or Firm—Cushman, Darby & Cushman

[57] ABSTRACT

In a magnetic recording medium such as VTR tape, a magnetic layer coated on a non-magnetic substrate comprises a binder of polyurethane resin of a reaction products among etheralcohol, polyesterpolyol, diisocyanate compound and silicon compound represented by the following general formula:

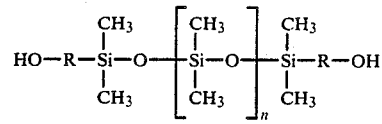

(R: alkyl group, n: 1 or larger integer) and ferromagnetic powder dispersed in said binder; and the recording medium has very low friction coefficient, high C/N value and high durability without increase of amount of conventional lubricant or anti-abrasion agent in the magnetic layer.

5 Claims, No Drawings

MAGNETIC RECORDING MEDIUM

FIELD OF THE INVENTION AND RELATED ART STATEMENT

1. Field of the Invention

The present invention relates generally to a magnetic recording medium usable for audio tape, video tape, magnetic disk, etc., and particularly to a magnetic recording medium of specifically high performance characteristics and high durability.

2. Description of the Related Art

In recent years, with regard to the magnetic recording medium, improvements for higher grade and higher recording density are being made by improving electromagnetic characteristics through attaining fine particles of magnetic powder, improvement of magnetic properties and higher smoothness of magnetic layer. However, when the smoothness of the magnetic layer becomes higher, friction coefficient rises, and especially in case of the video tape its running ability becomes worse, thereby inducing possibility of damaging the magnetic layer or head surface and lowering characteristics and durability of the tape. In order to improve the above-mentioned phenomenon of increase of the friction coefficient, several proposals were made to decrease the friction coefficient of the surface of the magnetic layer by adding carbon black, $Cr_2O_3$, $Al_2O_3$, high class fatty acid, alcohol of fat group, fatty acid ester, silicone oil, etc. as disclosed in the U.S. Pat. Nos. 4,171,406, No. 4,501,800, No. 4,501,801, No. 4,556,604 and No. 4,579,780.

In a high grade magnetic tape for use especially in high density recording or in recently used 8 mm video tape whereon a magnetic layer containing metal powder principally consisting of iron is formed, smooth tape running characteristic is not achievable conventionally by adding the additives to the magnetic powder, when the magnetic powder content in the magnetic layer is made high and surface roughness of the magnetic layer is made so small as 120 Å or lower (in Rrms expression).

When inorganic solid state substance such as carbon black, $Cr_2O_3$, $Al_2O_3$, graphite, etc., is added much in the magnetic layer to improve the friction coefficient for better running characteristic, although the running characteristic is improved, the electromagnetic characteristics are undesirably lowered as a result of decrease of content of magnetic powder in the magnetic layer. On the other hand, when high class fatty acid, fatty acid alcohol, fatty acid ester, silicone oil, or the like organic material is added much in the magnetic layer also to improve the friction coefficient, sufficient lubrication characteristic is not assured, and furthermore these added materials are liable to break out to the surface of the magnetic layer at a high temperature and high humidity environment, thereby inducing a problem of tape blocking phenomenon or increase of friction coefficient which induces stick-slip phenomenon. Thus, tape characteristics and durability are lowered.

OBJECT AND SUMMARY OF THE INVENTION

Accordingly, the object of the present invention is to provide a magnetic recording medium having a good running characteristic and high durability.

Another object of the present invention is to provide a recording tape of high density recording type having splendid running characteristic and small surface roughness.

According to the present invention, magnetic recording medium such as magnetic tape, which has satisfactory running characteristic, high C/N value and high durability without increase of amount of addition of the conventional lubricant or anti-abrasion agent, is provided.

In order to attain the above-mentioned objects, the magnetic recording medium in accordance with the present invention comprises:
a non-magnetic substrate and
a magnetic layer provided on the non-magnetic substrate, the magnetic layer comprising a binder of a polyurethane resin of a reaction products among ether-alcohol, polyesterpolyol, diisocyanate compound and silicon compound represented by the following general formula:

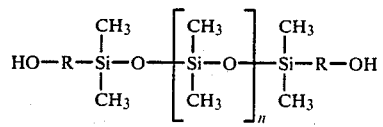

(R: alkyl group, n: 1 or larger integer) and ferromagnetic powder dispersed in the binder.

In the present invention, according to the above-mentioned constitution, even though the magnetic layer has splendid surface smoothness, satisfactory sliding ability and durability against abrasion of the magnetic layer are obtainable through decrease of friction coefficient, by inclusions of principal chain containing silicon and many aromatic rings to the binder resin so as to improve lubricity and strength of the binder. Therefore, running characteristic of the magnetic tape is improved and blocking phenomenon and stick slip phenomenon of the magnetic tape are prevented without increasing amount of additives such as lubricant, anti-abrasion agent, grinding agent, etc. Thus, high durability is provided to the magnetic tape without deteriorating necessary electromagnetic characteristics.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, preferred embodiment of the present invention is described.

On one face of films of polyethylenetelephtalate (hereafter PET) of 14 μm thickness as substrate, magnetic coating materials having compositions shown in Table 1 are applied to form respective magnetic layers of 4 μm thickness, followed by orientation, drying, mirror-surface-polishing, and subsequent hardening, to form magnetic recording layers. Besides, on the opposite face of the substrate, a known back-coat layer of 0.8 μm thickness comprising a resin consisting mainly of polyurethane as binder and dispersion pigment mainly consisting of carbon-black is formed. Thus magnetic recording tapes for VTR are made.

TABLE 1

| | Amount of material: Weight parts Composition | | | | | |
|---|---|---|---|---|---|---|
| | Embodiments | | | | Comparison examples | |
| Material | A | B | C | D | E | F |
| Magnetic powder | 100 | 100 | 100 | 100 | 100 | 100 |
| Polyurethane-polyol | | | | | | |
| a | 12 | | | | | |
| b | | 12 | | | | |
| c | | | 12 | | | |
| d | | | | 12 | | |
| e | | | | | 12 | 12 |
| Nitrocellulose | 10 | | 10 | | 10 | |
| Vinyl chloride-vinyl acetate copolymer | | 10 | | 10 | | 10 |
| α-alumina powder (average grain size: 0.25 μm) | 7 | 7 | 7 | 7 | 7 | 7 |
| Carbon black powder | 1 | 1 | 1 | 1 | 1 | 2 |
| Lecithin | 0.5 | 0.5 | 0.5 | 0.5 | 0.5 | 0.5 |
| Stearic acid | 1 | 1 | 1 | 1 | 1 | 4 |
| Butyl stearate | 1 | 1 | 1 | 1 | 1 | 1 |
| Isocyanate compound | 4 | 4 | 4 | 4 | 4 | 4 |
| Solvent | 300 | 300 | 300 | 300 | 300 | 350 |
| Average surface roughness (Ra) | 0.013 μm | 0.013 μm | 0.0125 μm | 0.013 μm | 0.013 μm | 0.145 μm |
| Dynamic friction coefficient | 0.23 | 0.24 | 0.24 | 0.24 | 0.35 | 0.32 |
| C/N | +0.7 dB | +0.6 dB | +0.5 dB | +0.6 dB | +0.3 dB | +0.1 dB |
| Durability after 100 passes under 10° C. 10% RH | No change observed | No change observed | No change observed | No change observed | Debris and head clogging observed | Debris and head clogging observed |

In Table 1, the compositions A, B, C and D are embodiments of the present invention, and compositions E and F are comparison examples. The magnetic powders are Co-coated iron oxide powder of the following characteristics.

$$\left( \begin{array}{ll} \text{B.E.T specific surface area} & 43 \text{ m}^2/\text{g} \\ \text{Hc} & 650 \text{ Oe} \\ \delta s & 75 \text{ emu/g} \end{array} \right)$$

The polyurethanepolyol resins a, b, c and d constitutes resins which are used in the embodiments of the present invention. Details of the polyurethanepolyol resins are as follows:

<Resin a>

The resin a is obtained by a reaction among:

etheralcohol having aromatic rings represented by the general formula of

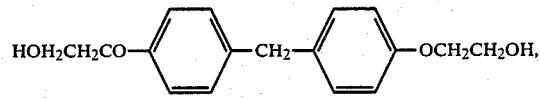

polyesterpolyol consisting essentially of a 1.4 buthanediol and an adipic acid, a silicon compound having a molecular weight of about 1000 represented by the following general formula:

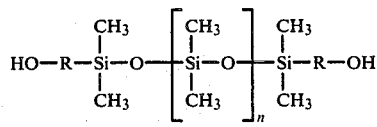

(R: alkyl group, n: 1 or larger integer) and diphenyl diisocyanate.

Etheralcohol is paste, polyesteropolyol is resin, and the silicon compound and diphenyl diisocyanate are solution. All of these starting materials are put and dissolved in methylethylketone at a reacting temperature of 70° C. Then, the resin a is produced.

<Resin b>

The resin b is a similar polyurethanepolyol resin obtained by a similar reaction to the above-mentioned case of the resin a, wherein only difference therefrom is that the etheralcohol having aromatic rings is represented by the general formula of

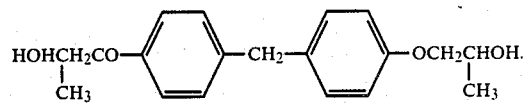

<Resin c>

The resin c is a similar polyurethanepolyol resin obtained by a similar reaction to the above-mentioned case of the resin a, wherein only difference therefrom is that the etheralcohol having the aromatic rings is represented by the general formula of

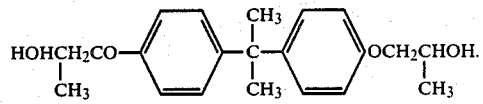

<Resin d>

The resin d is a similar polyurethanepolyol resin obtained by a similar reaction to the above-mentioned case of the resin a, wherein only difference is that molecular weight of the silicon compound is 1800.

>Resin e of the comparison example>

The resin e is a polyurethanepolyol resin, which does contain no etheralcohol having aromatic rings nor silicon compound. A resin named Nipporan N-2304 made by Nippon Polyurethane Kogyo Kabushiki Kaisha was used as the resin e. As the isocyanate compound, a compound named Koroneito L made by Nippon Polyurethane Kogyo Kabushiki Kaisha was used.

It was confirmed that addition and mixing of the isocyanate compound in the magnetic coating material makes the magnetic layer hard. A solvent of methylethylketone:toluen:cyclohexane of 2:2:1 composition was used in the process of coating.

A magnetic tape thus obtained was cut into ½ inch width, and average surface roughness and dynamic friction coefficient of the magnetic layer surface were measured, and the resultant tape was wound in a cassette halves and C/N at 5 MHz was measured. The C/N measurement was made by a VHS video tape recorder (NV-8800 manufactured by Matsushita Electric Industrial Co., Ltd.). As a reference standard tape, super HG120 (NV-T120HG, manufactured by Matsushita Electric Industrial Co., Ltd.) is used, and C/N value thereof is taken as 0 dB. Durability was observed after runnings of 100 passes under a condition of 10° C.-10%RH.

Results of the observations are shown in bottom four lines of Table 1.

As has been described with reference to the preferred embodiment, polyurethanepolyol resin, which is obtained by a reaction among etheralcohol having aromatic rings, polyesterpolyol, a silicon compound having OH group at both ends of dimethylpolysiloxane and diisocyanate compound, is used as a binder to form a magnetic recording layer of a magnetic recording medium. Thus a magnetic tape of superior characteristic is made having small dynamic friction coefficient, even though surface roughness of the magnetic layer is small, and the tape has higher C/N value and satisfactory durability confirmed by the durability test.

What is claimed is:

1. A magnetic recording medium comprising:
   (a) a non-magnetic substrate and
   (b) a magnetic layer provided on said non-magnetic substrate, which comprises
      (i) a binder of polyurethane resin obtained from the reaction products of etheralcohol, polyesterpolyol, a diisocyanate compound and a silicon compound having an average molecular weight of about 1000 to 1800 represented by the following general formula:

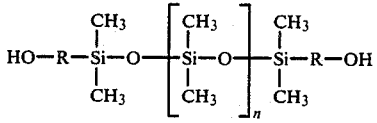

in which R is an alkyl group and n is 1 or a larger integer, and (ii) ferromagnetic powder dispersed in said binder.

2. A magnetic recording medium in accordance with claim 1, wherein
said polyurethane resin is a reaction product of etheralcohol having aromatic rings represented by the following formula:

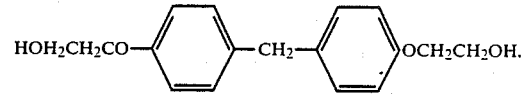

a polyesteropolyol consisting essentially of a 1.4 a polyesterpolyol consisting essentially of a 1.4 butanediol and an adipic acid, and a silicon compound which is a dimethylpolysiloxane having OH groups at both ends thereof and having a molecular weight of about 1,000, represented by the following general formula:

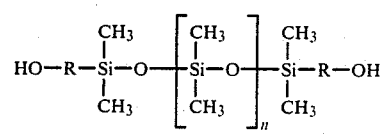

in which R is an alkyl group and n is 1 or a larger integer, and a diphenylmethanediisocyanate.

3. A magnetic recording medium in accordance with claim 1, wherein
said etheralcohol has aromatic rings and is represented by the following formula;

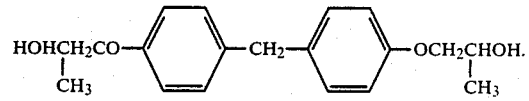

4. A magnetic recording medium in accordance with claim 1, wherein
said etheralcohol has aromatic rings and is represented by the following formula:

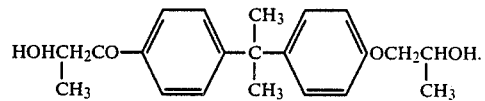

5. A magnetic recording medium in accordance with claim 1, wherein
said silicon compound is a dimethylpolysiloxane having OH group at both ends thereof and having a molecular weight of about 1800.